United States Patent
McConnell et al.

(10) Patent No.: US 8,272,042 B2
(45) Date of Patent: Sep. 18, 2012

(54) SYSTEM AND METHOD FOR AUTOMATION OF INFORMATION OR DATA CLASSIFICATION FOR IMPLEMENTATION OF CONTROLS

(75) Inventors: James T. McConnell, Keller, TX (US); David Dumas, Littleton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1057 days.

(21) Appl. No.: 11/565,959

(22) Filed: Dec. 1, 2006

(65) Prior Publication Data

US 2008/0134289 A1    Jun. 5, 2008

(51) Int. Cl.
G06F 21/00    (2006.01)

(52) U.S. Cl. .............. 726/13; 726/12; 726/14; 726/15; 713/165; 713/166; 713/167; 713/168; 713/169; 713/170; 709/227; 709/228; 709/229

(58) Field of Classification Search ............ 726/27, 726/2–6, 11–17; 713/187–188, 164–172; 709/225, 227–230
See application file for complete search history.

(56) References Cited

U.S. PATENT DOCUMENTS

| | | | |
|---|---|---|---|
| 6,272,639 B1 * | 8/2001 | Holden et al. | 726/12 |
| 7,232,948 B2 * | 6/2007 | Zhang | 84/600 |
| 7,388,958 B1 * | 6/2008 | Maier | 380/270 |
| 7,516,492 B1 * | 4/2009 | Nisbet et al. | 726/27 |
| 7,644,266 B2 * | 1/2010 | Ahuja et al. | 713/151 |
| 7,688,858 B2 * | 3/2010 | Mane | 370/473 |
| 7,836,490 B2 * | 11/2010 | Smith | 726/4 |
| 2005/0038993 A1 * | 2/2005 | Zivic et al. | 713/164 |
| 2006/0165062 A1 * | 7/2006 | Nishida et al. | 370/352 |
| 2006/0218399 A1 * | 9/2006 | FitzGerald et al. | 713/168 |

OTHER PUBLICATIONS

Wei Wang et. al., Network Traffic Monitoring, Analysis and Anomaly Detection, May/Jun. 2011, IEEE Network.*

* cited by examiner

*Primary Examiner* — Taghi Arani
*Assistant Examiner* — Josnel Jeudy (57) ABSTRACT

A system, method and computer program product are provided for monitoring data traffic on one or more networks, determining the classification of the data based on an organization's classification rules, and assigning a classification to one or more entities involved in the transmission of the data, the classification being based at least in part on the classification of the data being transmitted. The classification rules may be based on an organization's classification categories of confidentiality, integrity and availability (CIA). The system, method and computer program product are also provided for implementing controls based on the classifications of the various entities, such as issuing an alert and/or preventing transmission of data if the data is transmitted between two entities that have different classifications.

17 Claims, 8 Drawing Sheets

SYSTEM AND METHOD FOR AUTOMATION OF INFORMATION OR DATA CLASSIFICATION FOR IMPLEMENTATION OF CONTROLS

BACKGROUND

In the past, tools have been used to monitor data traversing a network and generally recognize or categorize the content of the data. These tools are employed for various reasons including efforts to identify instances in which certain types of data (e.g., secure data such as credit card numbers) are sent from and/or to computers or individuals who do not have the authority to send or receive such data.

While various tools have been developed, it would be desirable to make further use of the information relating to the data of the information transmitted via a network. For example, it would be advantageous to assign classifications or additional classifications to the entities transmitting the data based upon the classification of the data itself. Moreover, it would be advantageous to be able to change the criticality of a data transmission event based on the classification of the entities transmitting the data. To date, however, conventional tools have not utilized the information relating to the classification of the data being transmitted in order provide these functions.

DETAILED DESCRIPTION OF PREFERRED EMBODIMENTS

Exemplary embodiments will now be described hereinafter with reference to the accompanying drawings, in which exemplary embodiments and examples are shown. Like numbers refer to like elements throughout.

As may be appreciated, exemplary embodiments may be implemented as a method, a system, or a computer program product. Accordingly, embodiments may take the form of an entirely hardware embodiment, an entirely software embodiment, or an embodiment combining software and hardware aspects. Furthermore, exemplary embodiments may take the form of a computer program product on a computer-readable storage medium having computer-readable program instructions (e.g., computer software) embodied in the storage medium. More particularly, exemplary embodiments may take the form of web-implemented computer software. Any suitable computer-readable storage medium may be utilized including hard disks, CD-ROMs, optical storage devices, magnetic storage devices, etc.

Exemplary embodiments are described below with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
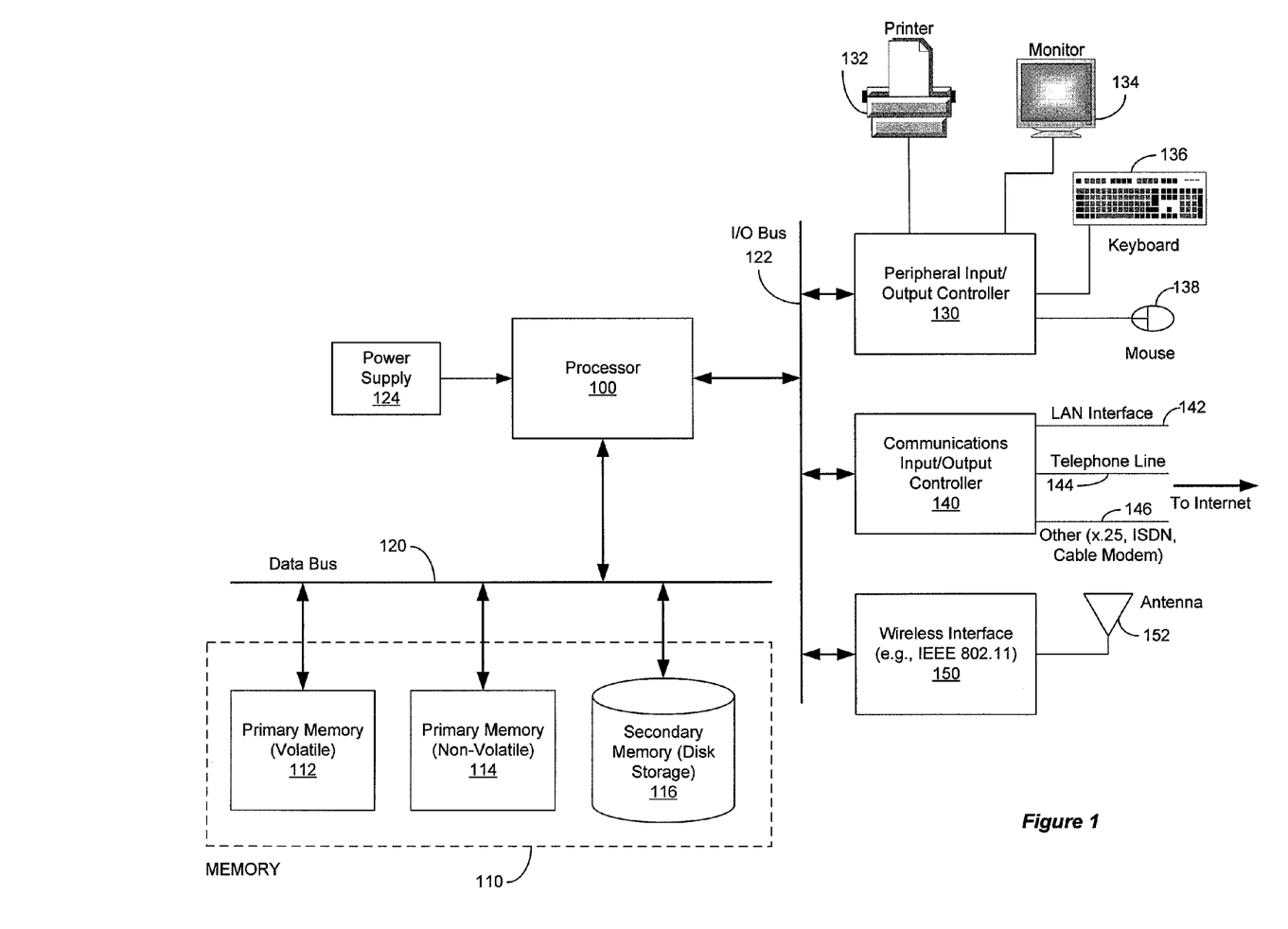
FIG. 1 is an illustration of one embodiment of a computing device.

In the embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus. In some instances, the computer may be a "dumb" terminal used to access data or processors over a network. Turning to FIG. 1, one embodiment of a computing device is illustrated that can be used to practice aspects of the various exemplary embodiments. In FIG. 1, a processor 100, such as a microprocessor, is used to execute software instructions for carrying out the defined steps. The processor 100 receives power from a power supply 124 that also provides power to other components as necessary. The processor 100 communicates using a data bus 120 that is typically, but not necessarily, 16 or 32 bits wide (e.g., in parallel). The data bus 120 is used to convey data and program instructions, typically between the processor 100 and memory 110. In various embodiments, memory 110 can be considered primary memory 112 that is RAM or other forms which retain the contents only during operation, or it may be non-volatile 114, such as ROM, EPROM, EEPROM, FLASH, or other types of memory that retain the memory contents at all times. The memory could also be secondary memory 116, such as disk storage, that stores large amounts of data. In some embodiments, the disk storage 116 may communicate with the processor 100 using an I/O bus 122 instead of a dedicated bus (not shown). The secondary memory 116 may be a floppy disk, hard disk, compact disk, DVD, or any other type of mass storage type as is well known.

The processor 100 also communicates with various peripherals or external devices using an I/O bus 122. In various embodiments, a peripheral I/O controller 130 is used to provide standard interfaces, such as RS-232, RS-422, DIN, USB, or other interfaces as appropriate to interface with various input/output devices. Typical input/output devices include local printers 132, a monitor 134, a keyboard 136, and a mouse 138 or other typical pointing device (e.g., rollerball, trackpad, joystick, etc.).

The processor 100 typically also communicates using a communications I/O controller 140 with external communication networks, and may use a variety of interfaces such as data communication oriented protocols 146 such as X.25, ISDN, DSL, cable modems, etc. The communications controller 140 may also incorporate a modem (not shown) for interfacing and communicating with a standard telephone line 144. Finally, the communications I/O controller 140 may incorporate an Ethernet interface 142 for communicating over a local area network (LAN). Any of these interfaces may be used to access a wide area network, such as the Internet, intranets, LANs, or other data communication facilities.

Finally, the processor 100 may communicate with a wireless interface 150 that is operatively connected to an antenna 152 for communicating wirelessly with another device, using, for example, one of the IEEE 802.11 protocols, 802.15.4 protocol, or standard 3G wireless telecommunications protocols, such as CDMA2000 1x EV-DO, GPRS, W-CDMA, or other protocol.

Figure 2:
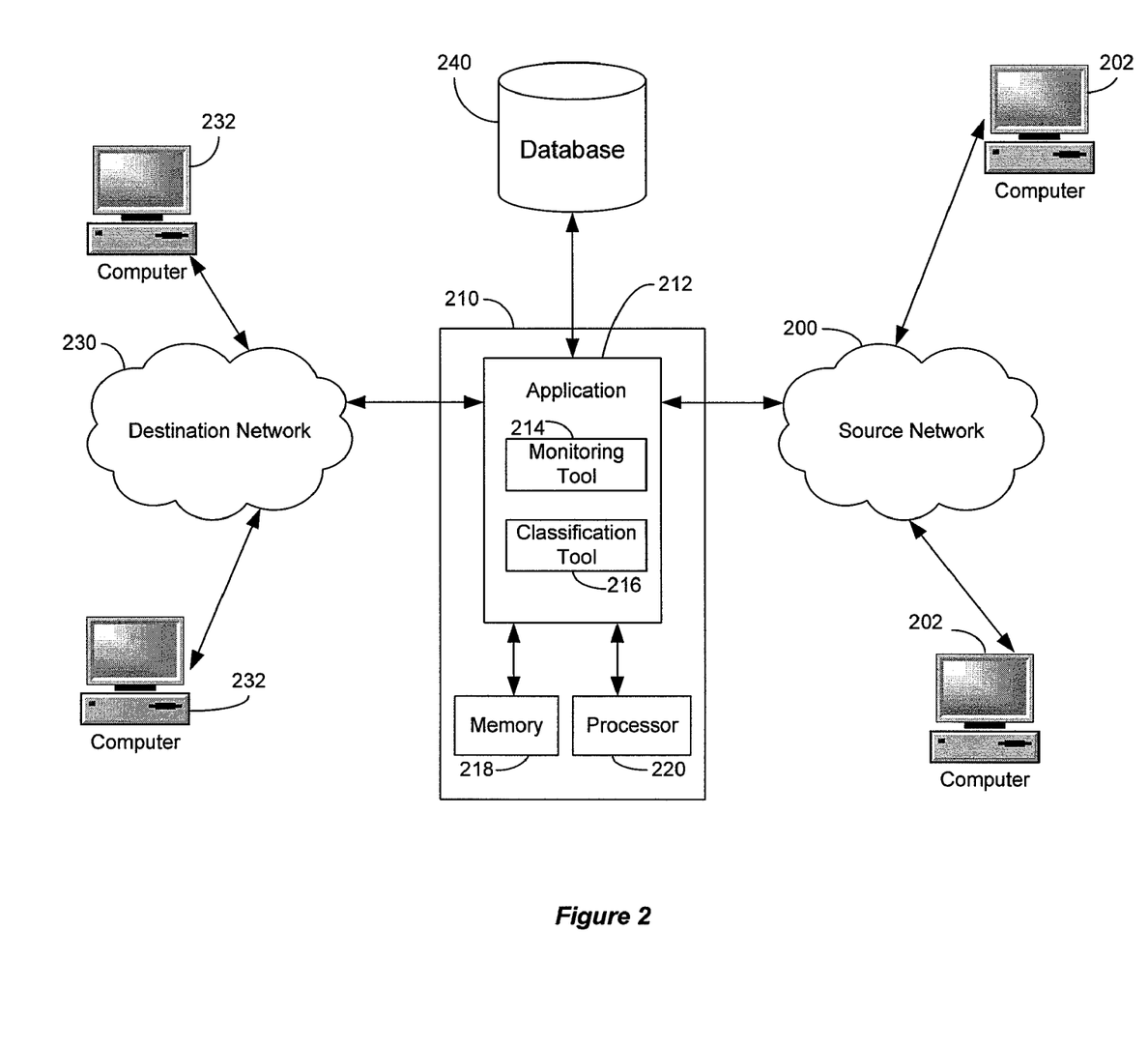
FIG. 2 is an illustration of one embodiment of an exemplary system having various computing devices in communication with each other via at least one network.

According to one embodiment, a system is provided for monitoring communications between one or more computers across at least one network and classifying the computers based on a classification of the communications transmitted between the computers. Thus, according to various embodiments, communications are transmitted between a source computer and a destination computer. For example, as shown in FIG. 2, a system is provided having a source network 200, such as a local area network (LAN). The source network 200 may also be a wide area network (WAN) such as the Internet or other network. The source network 200 has associated therewith one or more computers, such as the source computers 202. A source computer 202 may be identified by its network address (e.g., IP address), an identification number, a user associated with the computer, or other identifier. Likewise, in various embodiments, the source network 200 may have associated therewith one or more network addresses, users, computing systems, etc., that are not necessarily associated with a single source computer 202. In this situation, each of these entities may be classified under the same method as the classification of the source computers 202, described further below. Thus, although the description below generally refers to classifying a computer based on the data it transmits, the systems and methods described below apply equally to classifying a user based on the data transmitted by the user regardless of the computer employed by the user, classifying a network address based on data transmitted to or from the network address regardless of the user, etc. In such embodiments, a user may be identified by a user name or ID and a password. A network address may be identified by an IP address or other unique identifier. Further, a computer's classification may be dependent on its network address at any given time or the user who is accessing the computer at any given time. Thus, the computer's classification may change depending on the user accessing the computer or the network address assigned to the computer at any given time.

Referring to FIG. 2, the system may also have a destination network 230, which may be a LAN or WAN. The destination network 230 has associated therewith one or more computers, such as the destination computers 232. As described above with regard to the source computers 202, a destination computer 232 may be identified by its network address (e.g., IP address), an identification number, a user associated with the computer, or other identifier.

According to a preferred embodiment, an application 212 may be running on a computing device sitting on a network (e.g., the source network 200 or the destination network 230), or may be running on a computing device 210 that sits in between the source network 200 and destination network 230. The application 212 (and its constituent tools) may be embodied as software that is installed on a computing device 210 or other system that sits on or between the networks. Alternatively, the application 212 (and its constituent tools) may be a program that is already running on a computing device, or could be implemented as computer hardware or firmware. In a preferred embodiment, the application 212 includes a monitoring tool 214 and a classification tool 216. In various embodiments, the computing device 210 on which the application 212 runs may also include memory 218 and a processor 220 in communication with the application 212. As will be better understood from the description below, the monitoring tool 214 is configured to monitor traffic on or between one or more networks. For example, as depicted in FIG. 2, an application 212 running between a source network 200 and destination network 230 includes a monitoring tool 214 configured to monitor the traffic transmitted between the source and destination networks. In various embodiments, this traffic includes data and/or communications transmitted between the networks.

In various other embodiments, the application may run on a computing device sitting on a network and may be configured to monitor traffic transmitted between computers on that network, as well as traffic transmitted between that network and other networks. For instance, in one embodiment the application 212 runs on the source network 200 and is configured to monitor traffic (e.g., communications or data) transmitted between the source computers 202 (e.g., where one computer 202 serves as the source of the communication and another computer 202 serves as the destination of the communication). In such an embodiment, the monitoring tool 214 is also configured to monitor traffic transmitted between the source computers 202 and other computers that may be present on another network (e.g., the destination network 230).

In a preferred embodiment, the application 212 also includes a classification tool 216 configured to classify computers (e.g., the source computers 202 and/or destination computers 232) based on the classification of the data being transmitted or captured between the computers.

Organizations typically have classification rules for various types of data, such as the data that is sent in communications between computers. An organization may be a company, an educational institution (e.g., schools, colleges or universities), or an informal grouping of one or more computers (e.g., a family's home network of computers). The data is typically classified under sub-categories of Confidentiality, Integrity and Availability (CIA). Confidentiality (C) generally refers to the assurance of data privacy and ensuring that data is not disclosed to unauthorized entities. Integrity (I) generally refers to the assurance that data is not altered, particularly in transmission (i.e., from a source system to a destination system). Availability (A) generally refers to the assurance of timely and reliable access to data for authorized users and assurance that data is available when it is required. Generally, an organization determines the categories or types of data that it wants to classify and associates one or more classifications to this type of data. The types of data can encompass any data that the organization wishes to classify. For example, the types of data can include Social Security Numbers, credit card numbers, financial information, medical information, etc. Within each category of Confidentiality, Integrity and Availability, there are varying levels of classification. For example, within the sub-category of Confidentiality, the levels may be Highly Confidential, Confidential and Public. Likewise, within the sub-category of Integrity, the levels of classification may be Highly Controlled, Controlled and Non-Controlled. The levels within the sub-category of Availability may be Highly Available, Available, Low Availability. As may be appreciated, each sub-category may contain more or less than three levels of classification, and the levels are not limited to those recited above.

In one exemplary embodiment, the classification rules for the various types of data are stored in a database 240. In various other embodiments, the classification rules may be stored in any other form of memory, such as the secondary memory described above. The database 240 may be local to the computing device 210 on which the application 212 is running, or may be remote to the computing device 210. The classification rules may be stored as a primary look-up table, containing for example a listing of types of data and the classification(s) assigned to each type of data. In a preferred embodiment, a secondary look-up table is stored in the database 240 and contains a listing of the computers, network addresses, users, or other identifiers of entities of the system and their respective classifications. As may be appreciated, if a computer or other system entity has not yet been classified, it may not be listed in the secondary look-up table. Alternatively, the computer or other system entity may be listed in the secondary look-up table but may not have an associated classification. Additionally, the classification of types of data and classification of computers or other system entities may be stored in a single look-up table or database.

Figure 3:
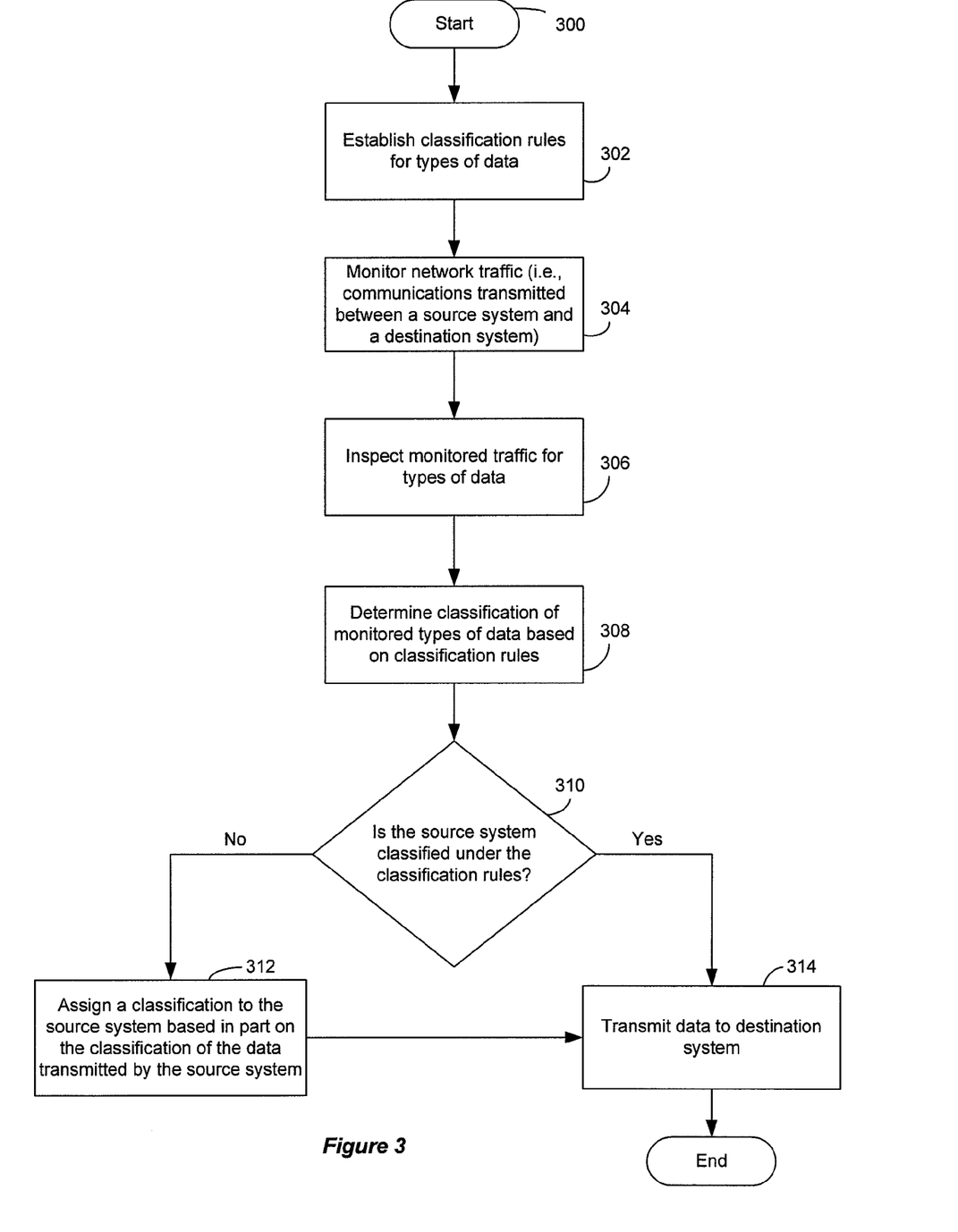
FIG. 3 is an exemplary flowchart for executing a process of monitoring data traffic on a network and classifying a system based in part on a classification of the data traffic according to one embodiment.

Referring to FIG. 3, at 302 an organization first establishes classification rules for the various types of data that it wishes to classify. For example, an organization may wish to classify a Social Security Number as Highly Confidential, Controlled, Highly Available. The same organization may classify a Press Release document, on the other hand, as Public, Non-Controlled, Highly Available. At 304, the network traffic (i.e., communications or data transmitted between a source computer 202 and destination computer 232) is monitored (e.g., by the monitoring tool 214). At 306, the monitored traffic is inspected for various types of data. This may be performed by the monitoring tool 214, the classification tool 216, or another application tool. Upon determining the types of data contained in the network traffic, the classification tool 216, at 308, determines the classification of the data types. The classification tool 216 may determine the classification of the data types by accessing a primary look-up table stored in a database, such as database 240.

At 310, the classification tool determines if the source system is classified under the classification rules established by the organization, such as by accessing a secondary look-up table in the database 240. Controls can then be implemented based on the source system classification. For example, if the source system is classified under the classification rules, at 314 the data is transmitted to the destination system. In this regard, a source system is considered to be classified under the classification rules if the source system is classified under each sub-category, such as each of the Confidentiality, Integrity and Availability sub-categories. In the alternative, if the source system is not classified at 314, a control may be implemented to prevent the data from being transmitted to the destination system.

If the source system is not classified under the classification rules in any one or all of the sub-categories, at 312 the classification tool assigns a classification to the source system based, at least in part, on the classification of the data transmitted by the source system. For example, if the source system is transmitting data of various classifications, the classification of the source system may be assigned solely based on the most secure classification (e.g., for each sub-category) of the data that is being transmitted. As an example, if the most secure data that is being transmitted by the source system is a Social Security Number (having, for example, a classification of Highly Confidential, Controlled, Highly Available), the source system will be classified under the same classification of the Social Security Number. In various other embodiments, the classification of a source system may be determined by a combination of the classifications of the types of data that it is transmitting (i.e., sending or receiving) and by other parameters relating to the transmitted data, such as the frequency of such data transmissions. For example, a system transmitting Social Security Numbers once per month may be classified under a less secure classification than a system transmitting Social Security Numbers on a daily basis. Once the classification has been assigned to the source system, at 314 the data is transmitted to the destination system and the classification assigned to the source system is stored in the database. In various embodiments, the data is transmitted regardless of whether the source system is classified. In other embodiments, the process of classifying the source system may occur simultaneously with the transmission of the data.

At 310, the classification tool may also determine whether the destination system is classified under the classification rules. As described with regard to 312, if the destination system is not classified, the classification tool assigns a classification based, at least in part, on the data transmitted to the destination system. In this regard, a destination system is considered to be classified under the classification rules if the destination system is classified under each sub-category, such as each of the Confidentiality, Integrity and Availability sub-categories.

Figure 4:
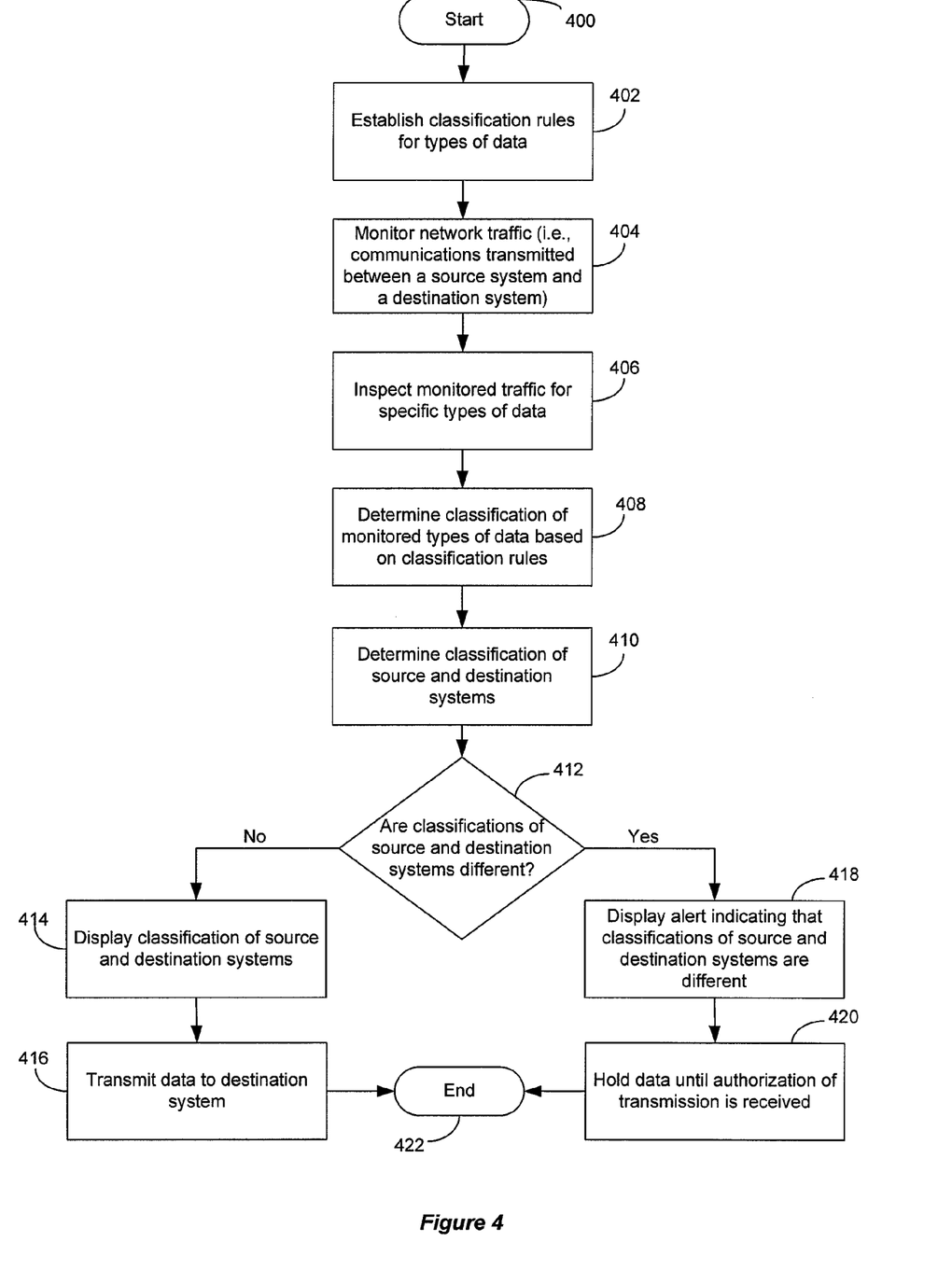
FIG. 4 is an exemplary flowchart for executing a process of monitoring data traffic between a source and destination system on a network and displaying the classification of the source and destination systems according to one embodiment.

Referring to FIG. 4, the process begins in a similar manner as that described with regard to FIG. 3. At 402, an organization establishes classification rules for the various types of data that may be transmitted (e.g., sent or received) by its system (e.g., computing devices, users, or other entities located on the organization's network). At 404, network traffic is monitored by the monitoring tool 214 and the monitored traffic is inspected for specific types of data. At 408, the classification tool 216 determines the classification of the monitored data by, for example, accessing the primary lookup table described above. At 410, the classification tool determines the classification of the source and destination systems for each sub-category. If one or both of the systems are not classified for any one or all of the sub-categories, the process may return to 310 to assign a classification to the system(s). However, if both of the systems are classified for all sub-categories, the process continues to 412 where a determination is made if the classification of the source and destinations systems is different.

If the classification of the source and destination system is the same, at 414 the classification of both systems is displayed. This information may be displayed, for example, to an individual or computer responsible for monitoring the security of the source system or destination system. Alternatively or additionally, this information may be displayed to the source system and/or destination system. In various embodiments, this information may not be displayed, but the event may be recorded in a security log or other log at the source and/or destination systems. At 416, a control may be implemented to transmit the data to the destination system.

If the classifications of the source and destination system are different, at 418 an alert is displayed indicating that the classifications are different. The source system may display this alert to an individual or computing device responsible for monitoring the security of the source system. Likewise, this information may be displayed to the user or computing device of the source system responsible for transmitting the data. In various embodiments, at 420 the data is held (e.g., stored temporarily in the memory 218 of the computing device 210 on which the application 212 is running) until authorization for transmission is received. In some embodiments, this authorization may be provided by the security personnel responsible for monitoring the security of the system. In other embodiments, the authorization may be provided by the user attempting to transmit the data, or by another individual at the computer from which the data is being transmitted. In various embodiments, an alert may not be displayed and the data may be transmitted without first requiring authorization. In such embodiments, a flag may be created and recorded in a security log, for example, for informational purposes or for later review by the security personnel of the organization.

Figure 5A:
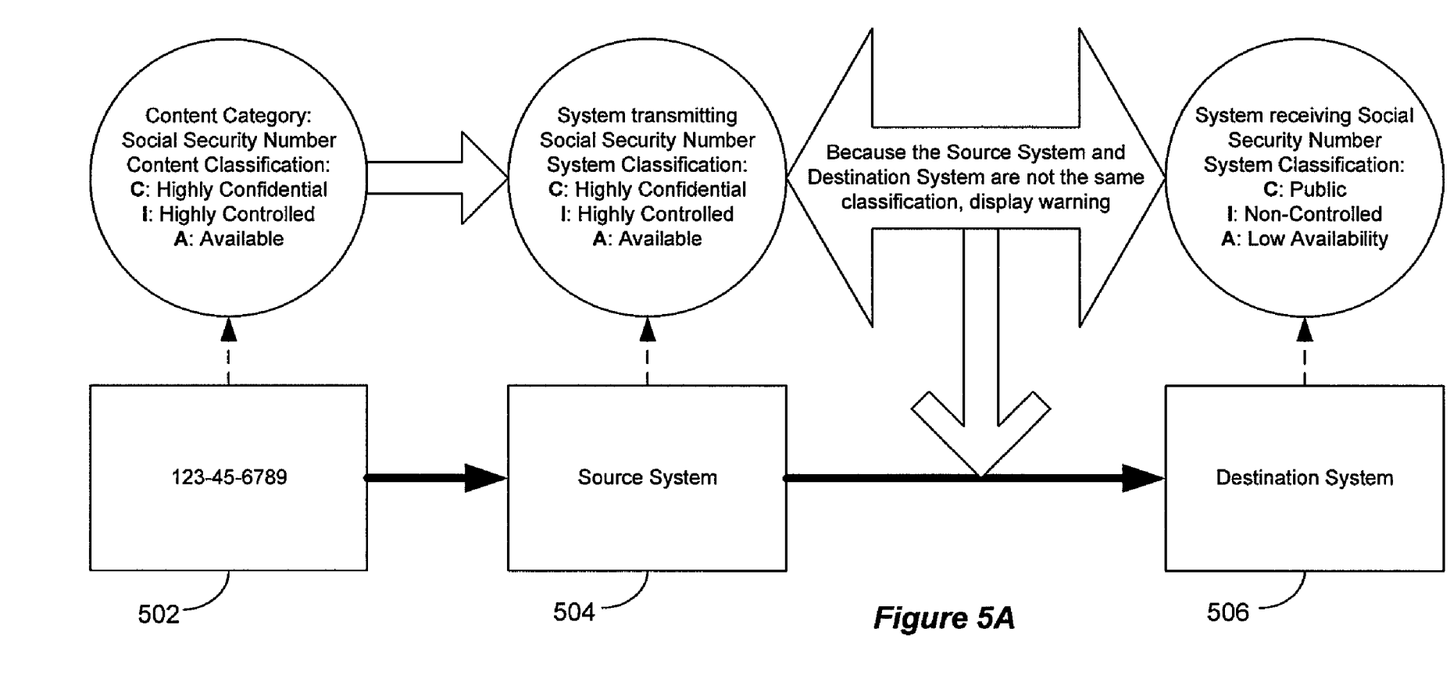
FIG. 5A is an illustration of an exemplary transmission of data in which the source system transmitting the data and the destination system receiving the data are classified differently.
Figure 5B:
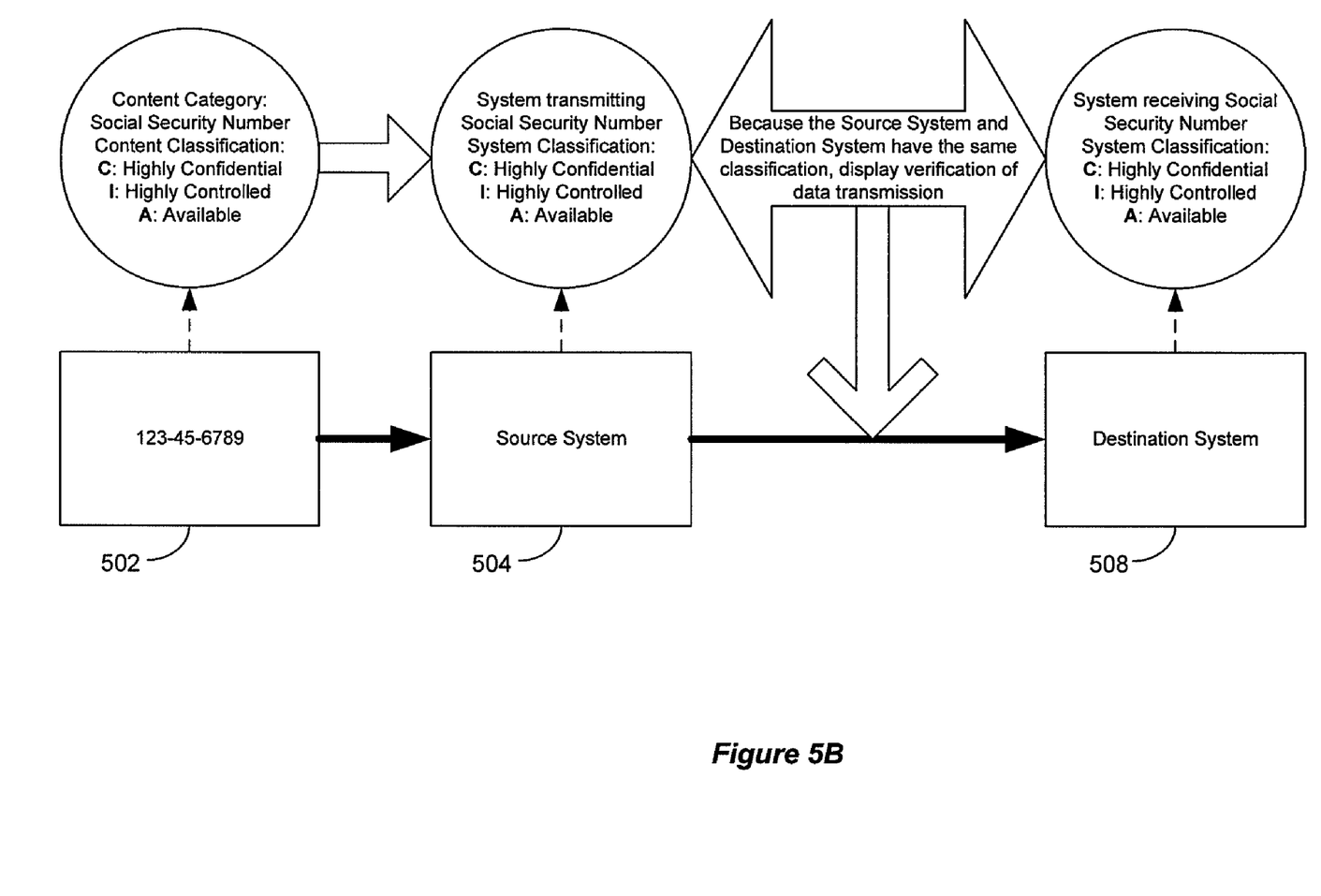
FIG. 5B is an illustration of an exemplary transmission of data in which the source system transmitting the data and the destination system receiving the data have the same classification.

FIGS. 5A and 5B illustrate exemplary embodiments in which a source system is classified based on the data being transmitted. For example, an organization may have assigned a Social Security Number 502 the classification of Highly Confidential, Highly Controlled, Available. As may be appreciated, this classification can differ from the classification of Social Security Numbers described above, since an organization can assign any desired classification to any data type. If a source system 504 transmits a communication containing a Social Security Number 502 and the source system is not already classified, the source system is classified based on the classification of the Social Security Number (as described above). In the embodiment shown in FIG. 5A, if the source system 504 transmits the Social Security Number to a destination system 506 having a classification of Public, Non-Controlled, Low Availability, the computing device 210 will generate a warning indicating that the classifications of the source system 504 and destination system 506 are different. This warning may be issued regardless of whether the destination system classification is more or less secure than the classification of the source system. In other embodiments, the warning may be issued only if the destination classification system is less secure than the classification of the source system. As described above, this warning or alert may be displayed to various users of the source or destination system, or the event may be flagged and recorded in a security log.

In the embodiment shown in FIG. 5B, if the source system 504 transmits the Social Security Number to a destination system 508 having the same classification as the source system 504 (e.g., Highly Confidential, Highly Controlled, Available), the data may is transmitted without an alert or warning being displayed. In some embodiments, a user transmitting the data may receive verification that the data was transmitted. In other embodiments, the event may be recorded as a successful transmission in a security log.

Figure 6A:
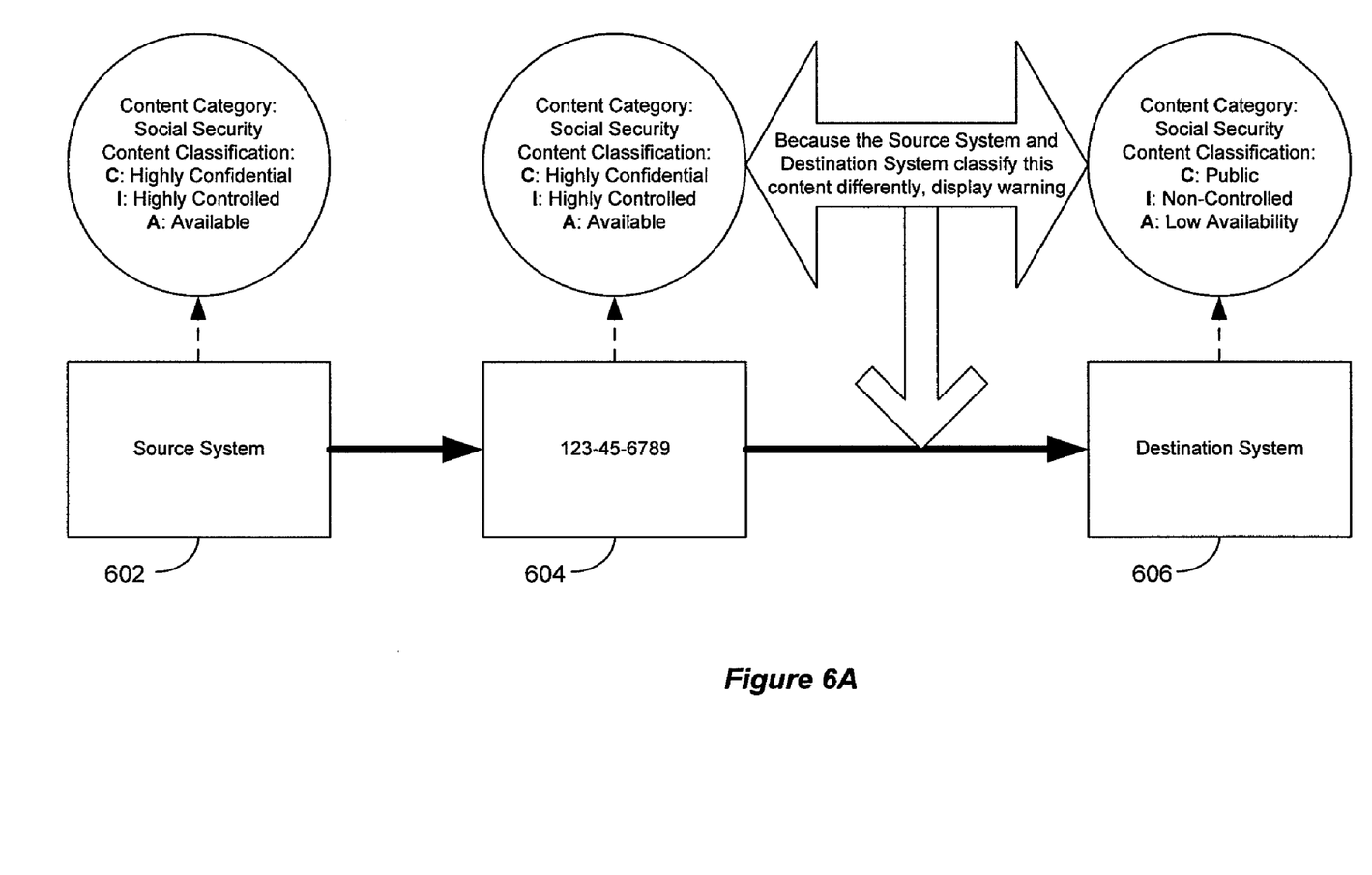
FIG. 6A is an illustration of an exemplary transmission of data in which a source system and a destination system classify the same type of data differently.
Figure 6B:
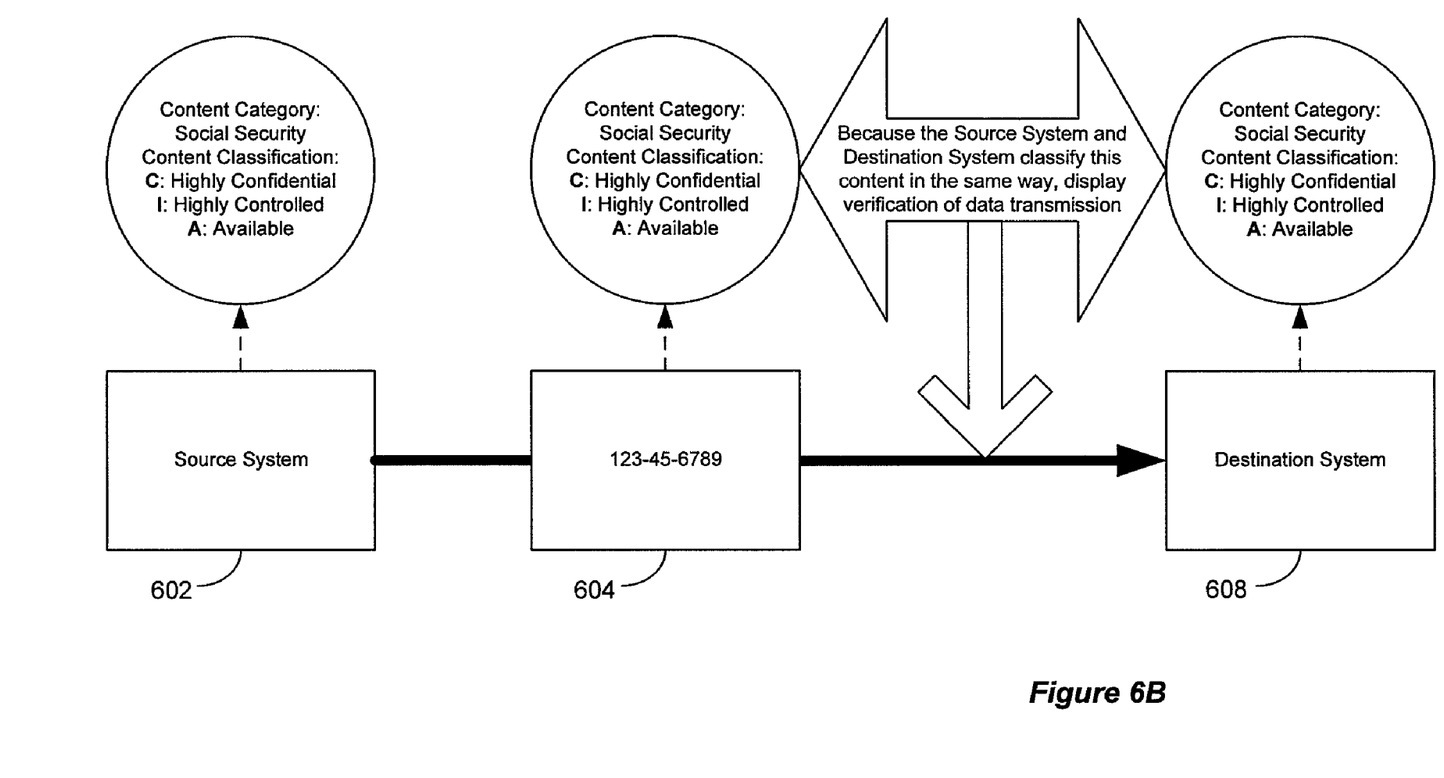
FIG. 6B is an illustration of an exemplary transmission of data in which a source system and a destination system classify the same type of data in the same way.

FIGS. 6A and 6B illustrate exemplary embodiments in which the successful transmission of data depends on the ways in which the source and destination systems classify the same type of data. For example, as illustrated in FIG. 6A, a source system 602 may classify a Social Security Number 604 as Highly Confidential, Highly Controlled, Available. A destination system 606 may classify the same type of data (i.e., Social Security Number) as Public, Non-Controlled, Low Availability. When the source system transmits the data, the classification tool 216 is configured to determine how the source system and destination system classify the data. As shown in FIG. 6A, because the source system and destination system classify the data differently, a warning or alert is displayed, as described above. As shown in FIG. 6B, if the destination system 608 classifies the Social Security Number 604 in the same way as the source system 602, the data is transmitted and a verification of the data transmission may be displayed or logged as described above.

In various embodiments, the application 212 is configured not only to monitor network traffic and classify computers (or users of a system) based on the classification of data transmitted, but is also configured to continue monitoring traffic once the computers are classified. For example, the application 212 may be configured to continue monitoring traffic to detect anomalies in data transmission and issue alerts or flag certain events if they are out of the ordinary. As an example, a computer that transmits Social Security Numbers once per month may be classified as Highly Confidential, Controlled, Highly Available based on the classification of the Social Security Number. However, the classification tool 216 of the application 212 may be further configured to record in the secondary look-up table how often data of this security classification is being transmitted from the computer. If the same computer begins transmitting communications containing Social Security Numbers on a daily basis, this would not change its classification. However, the classification tool may access the secondary look-up table each time a Social Security Number is transmitted and the application 212 may be configured to respond when the frequency of transmission increases (or in other examples, decreases). This event may be flagged or logged and may be later reviewed in order to determine whether the classification of the computer should be changed. This process may be fully automated by the application 212 or may involve input from a security personnel associated with the system transmitting the data. Therefore, in one exemplary embodiment, the system is configured to heuristically change or re-assign the classification of computers, users, etc. based on the data transmitted and the frequency of the transmissions, as well as other factors.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system, comprising:
a monitoring tool, executed by at least one hardware processor, configured to monitor communication of a source computer over a network, wherein the communication comprises one or more first types of data, and at least some of said first types of data are associated with a first security classification selected from a plurality of predetermined security classifications, wherein said predetermined security classifications comprise sub-classification categories of confidentiality, integrity and availability; and
a classification tool, executed by the at least one hardware processor, configured to:
assign one of said plurality of predetermined security classifications to said source computer based at least in part on said first security classification,
assign one of said plurality of predetermined security classifications to a destination computer receiving said communication from said source computer based at least in part on said first security classification,
determine whether said assigned security classification of said source computer is different from said assigned security classification of said destination computer;
wherein the monitoring tool is further configured to:
issue an alert and hold said communication until an authorization to transmit said communication is received when said assigned security classification of said source computer is different from said assigned security classification of said destination computer; and
transmit said communication when said assigned security classification of said source computer is the same as said assigned security classification of said destination computer.

2. The system of claim 1, further comprising a database for storing an identity of said source computer and said assigned security classification of said source computer.

3. The system of claim 1, wherein:
said monitoring tool is configured to monitor additional communications of said source computer; and
said classification tool is further configured to change said assigned security classification of said source computer based at least in part on a second security classification associated with said additional communications of said source computer.

4. A method, comprising:
monitoring communication of a source computer over a network, said communication comprising transmission of one or more first types of data;
using at least one hardware processor, determining a first security classification for at least some of said first types of data, said first security classification being selected from a plurality of predetermined security classifications, wherein said predetermined security classifications comprise sub-classification categories of confidentiality, integrity and availability;
using the at least one hardware processor, assigning a source computer security classification to said source computer based at least in part on said first security classification, said source computer security classification being selected from said plurality of predetermined security classifications;
using the at least one hardware processor, assigning a destination computer security classification to a destination computer based at least in part on said first security classification, said destination computer security classification being selected from said plurality of predetermined security classifications, and said destination computer identified as a recipient of said communication from said source computer;
using the at least one hardware processor, determining whether said source computer security classification is different from said destination computer security classification;
issuing an alert and holding said communication when said source computer security classification is different from said destination computer security classification; and
transmitting aid communication when said source computer security classification is the same as said destination computer security classification.

5. The method of claim 4, further comprising:
issuing an alert to said source computer if said source computer security classification is different from said destination computer security classification.

6. The method of claim 5, further comprising:
at least initially preventing said communication from being transmitted to said destination computer if said source computer security classification is more secure than said destination computer security classification.

7. The method of claim 4, further comprising:
receiving an identification of said one or more first types of data;
receiving an identification of said predetermined security classifications;
using the at least one hardware processor, associating at least some of said one or more first types of data with at least one of said plurality of predetermined security classifications; and
storing said first types of data and associated predetermined security classifications;
wherein receiving said identification of said one or more first types of data, receiving said identification, associating at least some of said one or more first types of data, and storing said first types of data occur prior to monitoring said communication of said source computer.

8. The method of claim 4, further comprising:
after assigning said source computer security classification to said source computer, monitoring an additional communication of said source computer over said network, said additional communication comprising transmission of one or more second types of data; determining a second security classification of said one or more second types of data; and
assigning a new source computer security classification to said source computer based at least in part on said second security classification, said new source computer security classification being selected from said plurality of predetermined security classifications, and said new source computer security classification being different from said source computer security classification if said second security classification of said second types of data is different from said first security classification of said first types of data.

9. A computer program product, comprising:
a memory having computer readable code embodied therein, for execution by a computing device having at least a processor and a memory, said code comprising:

a first computer executable code portion for monitoring communication of a source computer over a network, said communication comprising transmission of one or more first types of data;

a second computer executable code portion for determining a first security classification for at least some of said first types of data, said first security classification being selected from a plurality of predetermined security classifications, wherein each of said plurality of predetermined security classifications comprises sub-classification categories of confidentiality, integrity and availability;

a third computer executable code portion for assigning a source computer security classification to said source computer based at least in part on said first security classification, said source computer security classification being selected from said plurality of predetermined security classifications;

a fourth computer executable code portion for assigning a destination computer security classification to a destination computer based at least in part on said first security classification, said destination computer security classification being selected from said plurality of predetermined security classifications, and said destination computer identified as a recipient of said communication from said source computer;

a fifth computer executable code portion for determining whether said source computer security classification is different from said destination computer security classification;

a sixth computer executable code portion for issuing an alert to said source computer if said source computer security classification is different from said destination computer security classification; and a seventh computer executable code portion for preventing said communication from being transmitted at least initially to said destination computer if said source computer security classification is more secure than said destination computer security classification.

10. The computer program product of claim 9, further comprising:

an eight computer executable code portion for monitoring a second communication of said source computer over said network, said second communication comprising transmission of one or more second types of data; and a ninth computer executable code portion for assigning a new source computer security classification to said source computer based at least in part on said second security classification, said new source computer security classification being selected from said plurality of predetermined security classifications, and said new source computer security classification being different from said source computer security classification if said second security classification of said second types of data is different from said first security classification of said first types of data.

11. The system of claim 1, wherein said alert is issued when said assigned security classification of said source computer is different from said assigned security classification of said destination computer.

12. The system of claim 1, wherein the authorization to transmit said communication is received from said source computer.

13. The system of claim 1, wherein the monitoring tool further provides a notification of said assigned security classification of said source computer and said assigned security classification of said destination computer when said source computer security classification is the same as said destination computer security classification.

14. The system of claim 1, wherein the notification is provided to said source computer.

15. The system of claim 1, wherein the sub-classification category of confidentiality comprises one of highly confidential, confidential, and public.

16. The system of claim 1, wherein the sub-classification category of integrity comprises one of highly controlled, controlled, and non-controlled.

17. The system of claim 1, wherein the sub-classification category of availability comprises one of highly available, available, and low availability.

* * * * *